(12) United States Patent
Osada et al.

(10) Patent No.: US 6,282,797 B1
(45) Date of Patent: Sep. 4, 2001

(54) CUTTING MECHANISM FOR SABER SAW

(75) Inventors: Yoshio Osada, Hitachinaka; Toshihiko Tachibana, Hitachi, both of (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 09/468,127

(22) Filed: Dec. 21, 1999

(30) Foreign Application Priority Data

Mar. 12, 1999 (JP) .................................................. 11-067109

(51) Int. Cl.[7] .......................... B27B 19/00; B23D 61/12; B23D 49/04
(52) U.S. Cl. .................................. 30/392; 30/393; 30/394
(58) Field of Search .......................... 30/392, 393, 394; 83/646, 697, 699.21

(56) References Cited

U.S. PATENT DOCUMENTS

| | | |
|---|---|---|
| 3,269,197 | 8/1966 | Enders . |
| 3,461,732 | 8/1969 | Gregory . |
| 3,802,079 | 4/1974 | Ketchpel, Jr. et al. . |
| 3,945,120 | 3/1976 | Ritz . |
| 4,628,605 * | 12/1986 | Clowers .................................. 30/393 |
| 5,402,580 * | 4/1995 | Seto et al. ............................... 30/394 |
| 5,479,711 | 1/1996 | Hathcock . |
| 5,725,058 * | 3/1998 | Eriksson ............................ 30/392 X |
| 5,782,000 * | 7/1998 | Bednar .................................. 30/393 |
| 5,940,977 * | 8/1999 | Moores, Jr. ............................ 30/392 |
| 6,012,346 * | 1/2000 | Vo ..................................... 30/392 X |
| 6,047,477 * | 4/2000 | Di Nicolantonio ................... 30/392 |

FOREIGN PATENT DOCUMENTS

WO 98/07544    2/1998 (WO) .

* cited by examiner

Primary Examiner—Boyer Ashley
(74) Attorney, Agent, or Firm—Louis Woo

(57) ABSTRACT

A saber saw includes a housing. A motor is contained in the housing. A second shaft is rotatably connected to the housing, and is rotated by the motor. A plunger connected to the housing is used for holding a saw blade. The plunger is free to reciprocate. A motion converting mechanism provided between the second shaft and the plunger operates for converting rotation of the second shaft into reciprocation of the plunger. A guide member is connected to the housing, and has a track surface. The plunger is moved along the track surface of the guide member during reciprocation of the plunger.

23 Claims, 11 Drawing Sheets

CUTTING MECHANISM FOR SABER SAW

BACKGROUND OF THE INVENTION

1. Field of the Invention

This invention generally relates to a saber saw. This invention particularly relates to a cutting mechanism in a saber saw.

2. Description of the Related Art

Saber saws are basically of first and second types. In a saber saw of the first type, a saw blade is reciprocated along a linear path. In a saber saw of the second type, a saw blade is moved along an orbital path, for example, an elliptical path. The second type is also referred to as the orbital cutting type.

Prior-art saber saws of the orbital cutting type can not operate properly if saw blades are inversely attached to plungers or carriers.

SUMMARY OF THE INVENTION

It is an object of this invention to provide a saber saw of the orbital cutting type which can operate properly even when a saw blade is inversely attached to a plunger or a carrier.

A first aspect of this invention provides a saber saw comprising a housing; a motor contained in the housing; a second shaft rotatably connected to the housing and being rotated by the motor; a plunger connected to the housing for holding a saw blade, the plunger being free to reciprocate; a motion converting mechanism provided between the second shaft and the plunger for converting rotation of the second shaft into reciprocation of the plunger; a guide member connected to the housing and having a track surface; and means for moving the plunger along the track surface of the guide member during reciprocation of the plunger.

A second aspect of this invention is based on the first aspect thereof, and provides a saber saw wherein the guide member comprises a first sub guide member having a first sub track surface and a second sub guide member having a second sub track surface, and the moving means comprises a roller shaft connected to the plunger and extending through the plunger in a direction perpendicular to a direction of reciprocation of the plunger, and rollers connected to two ends of the roller shaft respectively, and contacting with and moving along the first and second sub track surfaces respectively during reciprocation of the plunger.

A third aspect of this invention provides a saber saw comprising a housing; a motor contained in the housing; a second shaft rotatably connected to the housing and being rotated by the motor; a plunger connected to the housing for holding a saw blade, the plunger being free to reciprocate; a guide sleeve connected to the housing and supporting the plunger, the guide sleeve being movable in a direction substantially perpendicular to a direction of reciprocation of the plunger; a motion converting mechanism provided between the second shaft and the plunger for converting rotation of the second shaft into reciprocation of the plunger; guide members connected to the housing and having track surfaces respectively; a roller shaft connected to a rear portion of the plunger and extending through the rear portion of the plunger in a direction perpendicular to a direction of reciprocation of the plunger, the roller shaft extending through the guide sleeve; and rollers connected to two ends of the roller shaft respectively, and contacting with and moving along the track surfaces of the guide members respectively during reciprocation of the plunger.

A fourth aspect of this invention is based on the first aspect thereof, and provides a saber saw wherein the guide member comprises an upper guide member and a lower guide member.

A fifth aspect of this invention is based on the fourth aspect thereof, and provides a saber saw wherein an end of the upper guide member and an end of the lower guide member are connected to each other.

A sixth aspect of this invention is based on the first aspect thereof, and provides a saber saw wherein the housing comprises an inner cover and a gear cover, and the guide member is firmly held between the inner cover and the gear cover.

A seventh aspect of this invention is based on the third aspect thereof, and provides a saber saw wherein the guide sleeve has an elongate hole extending along the direction of reciprocation of the plunger, and the roller shaft extends through the elongate hole in the guide member, and wherein a height dimension of the elongate hole is slightly greater than a diameter of the roller shaft.

An eighth aspect of this invention is based on the first aspect thereof, and provides a saber saw wherein the track surface of the guide member has one of a saw-toothed shape and a waveform.

A ninth aspect of this invention is based on the fourth aspect thereof, and provides a saber saw wherein a shape of a track surface of the upper guide member and a shape of a track surface of the lower guide member are different from each other.

A tenth aspect of this invention is based on the third aspect thereof, and provides a saber saw wherein each of the guide members comprises an upper guide member and a lower guide member.

An eleventh aspect of this invention is based on the tenth aspect thereof, and provides a saber saw wherein an end of the upper guide member and an end of the lower guide member are connected to each other.

A twelfth aspect of this invention is based on the third aspect thereof, and provides a saber saw wherein the housing comprises an inner cover and a gear cover, and the guide members are firmly held between the inner cover and the gear cover.

A thirteenth aspect of this invention is based on the third aspect thereof, and provides a saber saw wherein the track surfaces of the guide members have one of a saw-toothed shape and a waveform.

A fourteenth aspect of this invention is based on the tenth aspect thereof, and provides a saber saw wherein a shape of a track surface of the upper guide member and a shape of a track surface of the lower guide member are different from each other.

A fifteenth aspect of this invention provides a saber saw comprising a plunger for holding a saw blade; means for reciprocating the plunger along an axis of the plunger; an engagement member connected to the plunger; and first and second guide members having first and second engagement surfaces respectively, the first and second engagement surfaces angularly deviating from the axis of the plunger; wherein the engagement member contacts with and moves along either the first engagement surface of the first guide member or the second engagement surface of the second guide member during reciprocation of the plunger.

A sixteenth aspect of this invention is based on the fifteenth aspect thereof, and provides a saber saw wherein the engagement member comprises a roller.

A seventeenth aspect of this invention is based on the fifteenth aspect thereof, and provides a saber saw wherein the engagement member is located between the first and second engagement surfaces of the first and second guide members.

An eighteenth aspect of this invention provides a saber saw comprising a plunger for holding a saw blade; means for reciprocating the plunger along an axis of the plunger; first and second engagement members connected to the plunger; and first and second guide members having first and second engagement surfaces respectively, the first and second engagement surfaces angularly deviating from the axis of the plunger; wherein the first engagement member contacts with and moves along the first engagement surface of the first guide member so that the first engagement member and the first guide member are active during reciprocation of the plunger in a first mode of saber saw operation, and the second engagement member contacts with and moves along the second engagement surface of the second guide member so that the second engagement member and the second guide member are active during reciprocation of the plunger in a second mode of saber saw operation which differs from the first mode.

DESCRIPTION OF THE PREFERRED EMBODIMENTS

Prior-art saws of the orbital cutting type will be explained hereinafter for a better understanding of this invention.

Figure 1:
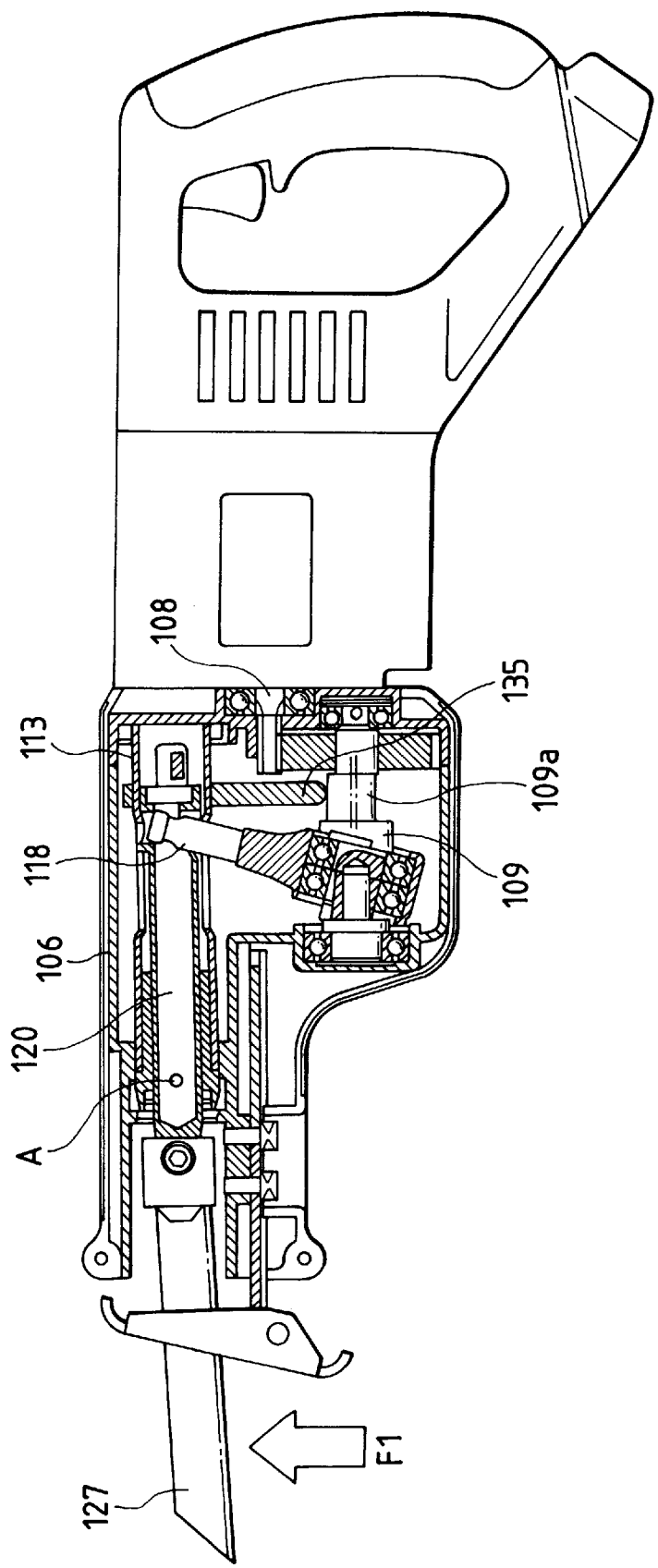
FIG. 1 is a side view, partially in section, of a prior-art saber saw.

FIG. 1 shows a prior-art saber saw of the orbital cutting type. The prior-art saber saw in FIG. 1 includes a driving gear 108 for rotating a second shaft 109. The second shaft 109 has an eccentric portion 109*a*. A reciprocating plate 118 for converting rotational motion into reciprocating motion is connected to the second shaft 109.

In the prior-art saber saw of FIG. 1, a plunger 120 couples with the reciprocating plate 118. A saw blade 127 is attached to an end of the plunger 120. The plunger 120 is slidably connected to a guide sleeve 113. The plunger 120 coaxially extends into the guide sleeve 113. The guide sleeve 113 is connected to a gear cover 106. The guide sleeve 113 can swing relative to the gear cover 106 about a radially-extending pin "A". As the second shaft 109 rotates, the reciprocating plate 118 periodically wobbles so that the plunger 120 reciprocates along axial directions (horizontal directions).

In the prior-art saber saw of FIG. 1, a connection plate 135 is connected to a rear portion of the guide sleeve 113. The connection plate 35 extends downward from the guide sleeve 113. A lower end of the connection plate 135 contacts the eccentric portion 109*a* of the second shaft 109. During operation of the saber saw, a reaction force F1 applied to the saw blade 127 from a workpiece swings the guide sleeve 113 in the clockwise direction about the pin "A" so that the lower end of the connection plate 135 is moved downward and pressed against the eccentric portion 109*a* of the second shaft 109. As the second shaft 109 rotates, the eccentric portion 109*a* thereof rotates. The connection plate 135 periodically moves up and down in accordance with rotation of the eccentric portion 109*a* of the second shaft 109. The guide sleeve 113 periodically swings about the pin "A" as the connection plate 135 periodically moves up and down. The plunger 120 moves in accordance with swing of the guide sleeve 113. Therefore, as the second shaft 109 rotates, the plunger 120 periodically swing in a vertical plane.

Figure 2:
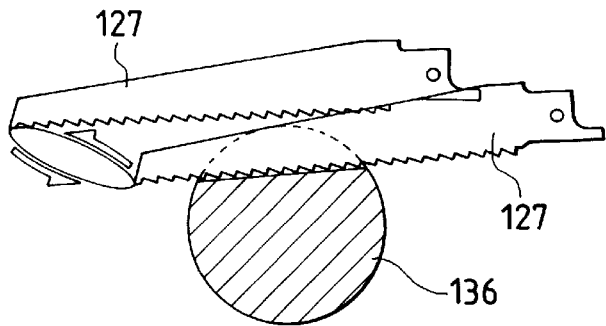
FIG. 2 is a diagram of a trajectory described by a saw blade in the prior-art saber saw in FIG. 1.

In the prior-art saber saw of FIG. 1, the saw blade 127 moves together with the plunger 120. During operation of the saber saw, the plunger 120 reciprocates in the horizontal directions while periodically swing in a vertical plane. Thus, the saw blade 127 moves along an elliptical path (an elliptical trajectory). The elliptical path is determined by the phase angle of the eccentric portion 109*a* of the second shaft 109 relative to the plunger 120. As shown in FIG. 2, the saw blade 127 is moved into a workpiece 136 and the teeth of the saw blade 127 properly engage the workpiece 136 when the saw blade 127 is drawn into the body of the saber saw.

Figure 3:
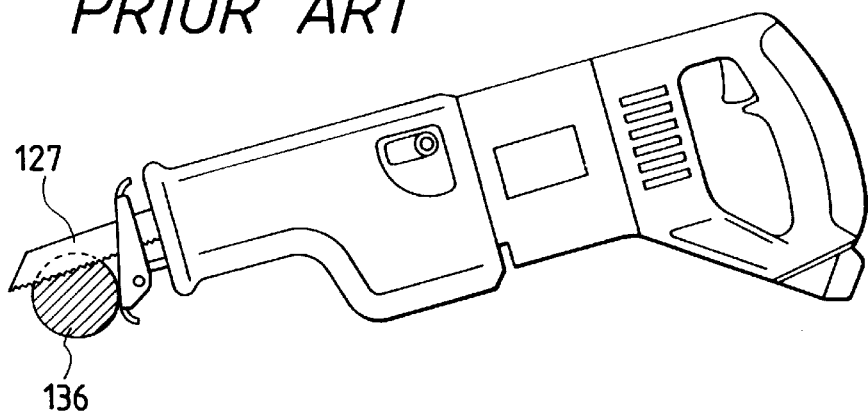
FIG. 3 is an illustration having a side view of the prior-art saber saw in FIG. 1 and a sectional view of a workpiece.
Figure 4:
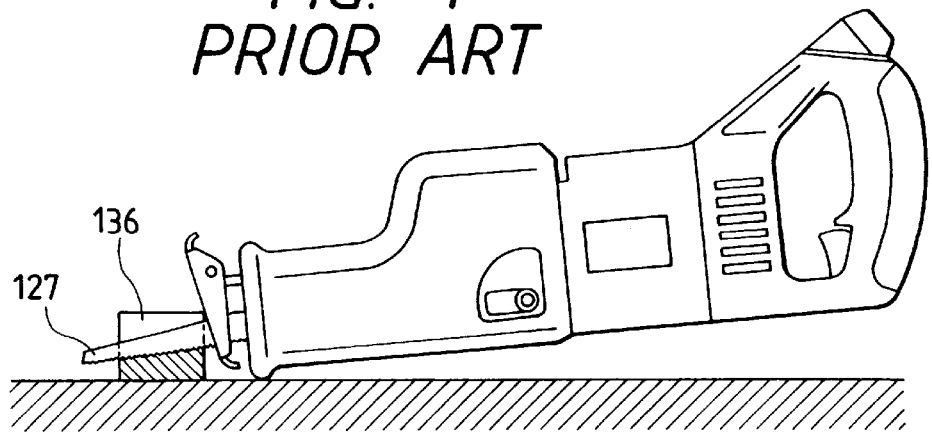
FIG. 4 is an illustration having a side view of the prior-art saber saw in FIG. 1 and a sectional view of a workpiece.
Figure 5:
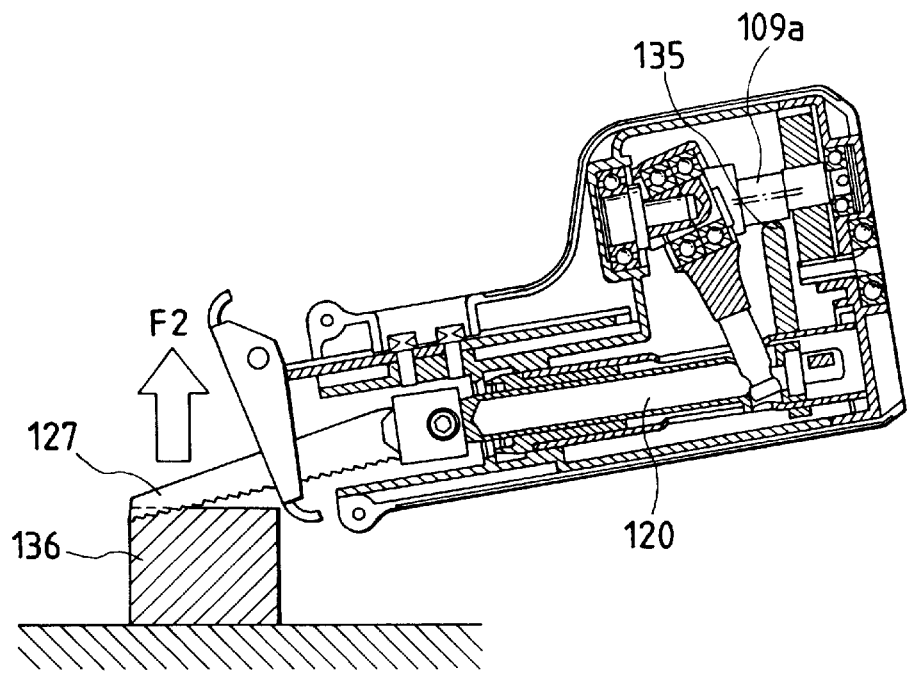
FIG. 5 is a sectional view of the prior-art saber saw in FIG. 1 and a workpiece.

FIG. 3 shows a condition of the prior-art saber saw in which the saw blade 127 is normally attached to the plunger 120 (see FIG. 1). FIGS. 4 and 5 show conditions of the prior-art saber saw in which the saw blade 127 is inversely attached to the plunger 120 (see FIG. 1). Under the conditions shown in FIGS. 4 and 5, a reaction force F2 applied to the saw blade 127 from a workpiece 136 brings the connection plate 135 out of contact with the eccentric portion 109*a* of the second shaft 109. Therefore, the plunger 120 and the saw blade 127 can not be swung in a vertical plane. Thus, the prior-art saber saw in FIGS. 1–5 can not operate properly if the saw blade 127 is inversely attached to the plunger 120.

Figure 6:
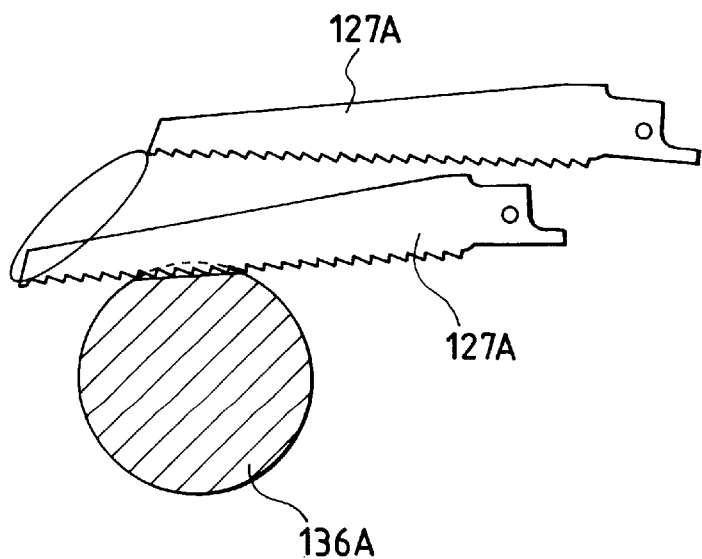
FIG. 6 is a diagram of a trajectory described by a saw blade in a prior-art hand-held saw.

U.S. Pat. No. 3,945,120 discloses a vibration dampening and heat sink mechanism for a reciprocating hand-held saw which has a carrier guide with limited axial and radial movement positively controlled by an eccentric. A drive shaft for an eccentric to provide such limited axial and radial movement also drives a wobble mechanism for reciprocating a saw blade carrier slidably mounted in the carrier guide. The center of gravity of the carrier guide travels in an elliptical path. Aggressive orbital action of the saw blade and saw blade carrier is provided in the case of cutting wood. In U.S. Pat. No. 3,945,120, the lag angle is defined as the angular difference, if any, between the position of the eccentric shaft and the wobble shaft which results in the delay of the opposing axial movement of the carrier guide with respect to the saw blade carrier. With reference to FIG. 6, in the case where the saw blade 127A is inversely attached to the saw blade carrier, the saw blade 127A is moved away from a workpiece 136A when being drawn into the body of the saw. Thus, the reciprocating hand-held saw in U.S. Pat. No. 3,945,120 can not operate properly if the saw blade is inversely attached to the saw blade carrier.

First Embodiment

Figure 7:
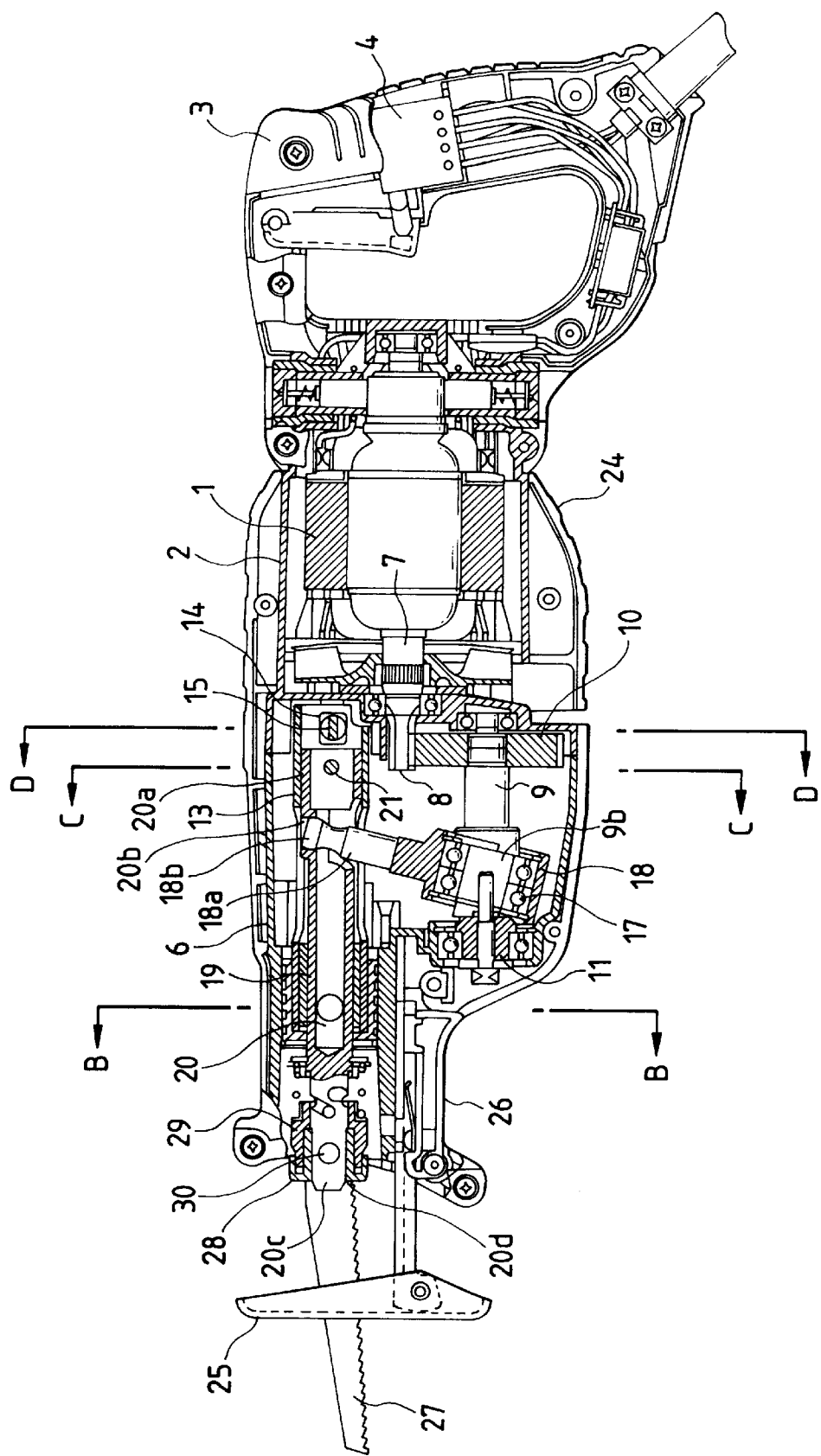
FIG. 7 is a sectional view of a saber saw according to a first embodiment of this invention.

With reference to FIG. 7, a saber saw of a first embodiment of this invention includes an electric motor 1 disposed in a motor housing 2 made of resin. A handle 3 is connected to a rear end of the motor housing 2. The handle 3 contains a switch 4 for controlling the feed of electric power to the electric motor 1.

With reference to FIGS. 7, 8, 9, and 10, an inner cover 5 and a gear cover 6 made of aluminum are connected to a front end of the motor housing 2. A power transmission mechanism, which will be mentioned later, is contained in the inner cover 5 and the gear cover 6. The electric motor 1 has an output shaft 7 whose end is formed with a driving gear 8. A second shaft 9 extends in parallel with the motor shaft 7. A driven gear 10 is mounted on the second shaft 9. The driven gear 10 meshes with the driving gear 8. A rotational force generated by the electric motor 1 is transmitted from the motor shaft 7 to the second shaft 9 via the driving gear 8 and the driven gear 10. Thus, the second shaft 9 is rotated by the electric motor 1. The driving gear 8 and the driven gear 10 act as a speed reduction mechanism. A front portion of the second shaft 9 is formed with an inclined shaft 9b. The angle between the axis of the inclined shaft 9b and the axis of the driven gear 10 is equal to about 14°. A sub shaft 11 is connected to a front end of the inclined shaft 9b. The sub shaft 11 is coaxial with the driven gear 10. The motor housing 2, the inner cover 5, and the gear cover 6 form a housing of the saber saw.

Figure 8:
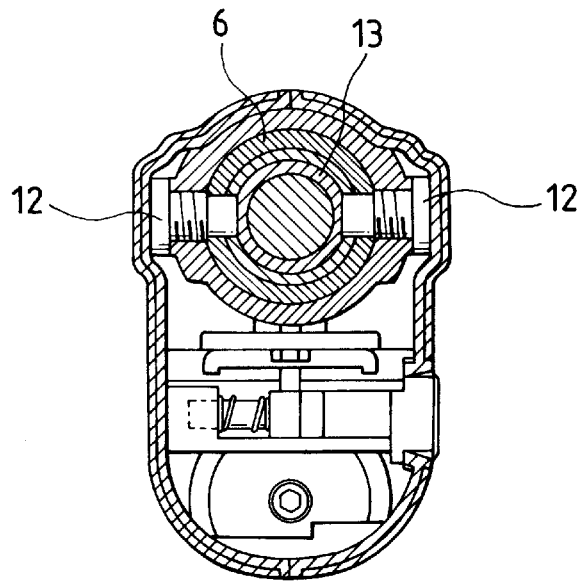
FIG. 8 is a sectional view taken along the line B—B in FIG. 7.

As best shown in FIG. 8, two bolts 12 are connected to a front portion of the gear cover 6. The gear cover 6 is approximately cylindrical. The bolts 12 radially extend through the walls of the gear cover 6. The bolts 12 engage the walls of the gear cover 6. The bolts 12 are diametrically opposite to each other. Thus, the bolts 12 have a common axis. A guide sleeve 13 extends in the gear cover 6. The guide sleeve 13 is connected with the tips of the bolts 12. The guide sleeve 13 can swing about the axis of the bolts 12. The axis of the bolts 12 extends horizontally with respect to the body of the saber saw, so that the guide sleeve 13 can swing in a vertical plane.

Figure 9:
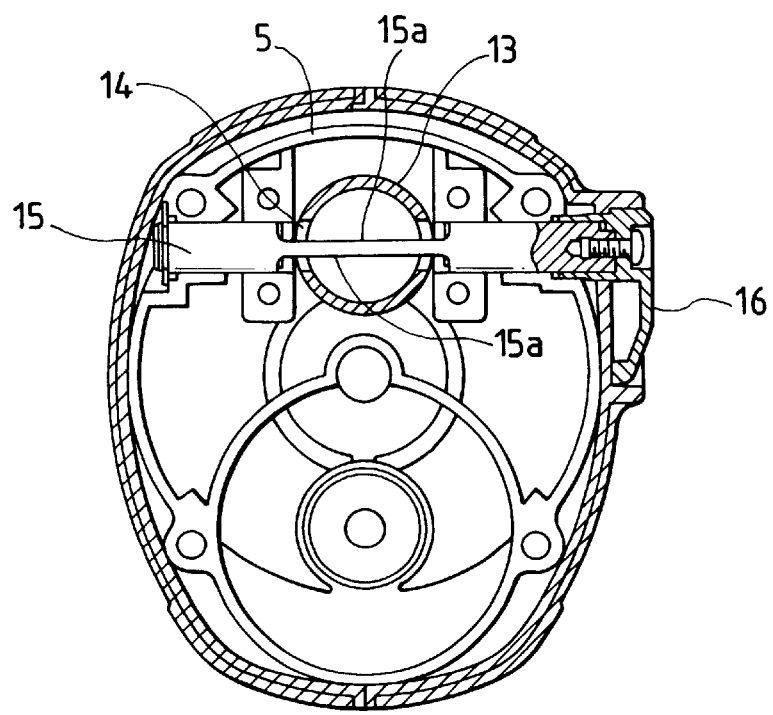
FIG. 9 is a sectional view taken along the line D—D in FIG. 7.

As best shown in FIG. 9, a rear end of the guide sleeve 13 is formed with a diametrical through hole 14 having a square or rectangular cross-section. A rotatable change shaft 15 extends through the inner cover 5, and also through the diametrical hole 14 in the guide sleeve 13. An intermediate part of the change shaft 15 has symmetrical flat surface portions 15a having dimensions (lengths) greater than the outside diameter of the guide sleeve 13. A change lever 16 is attached to an end of the change shaft 15. The change shaft 15 rotates as the change lever 16 is actuated. The swing of the guide sleeve 13 is selectively permitted or inhibited in accordance with the angular position (the rotational angle) of the change shaft 15. Thus, the swing of the guide sleeve 13 can be permitted or inhibited by actuating the change lever 16 to rotate the change shaft 15.

With reference back to FIG. 7, a reciprocating plate 18 is connected to the inclined shaft 9b on the second shaft 9 via two bearings 17. The reciprocating plate 18 has a wobble shaft 18a. A tip of the wobble shaft 18a is formed with a ball 18b. A bearing metal 19 is fitted in a front portion of the guide sleeve 13 by a pressing process. A plunger 20 extends through the bearing metal 19. The plunger 20 is slidably supported via the bearing metal 19. The plunger 20 coaxially and slidably extends into the guide sleeve 13. Thus, the plunger 20 is supported by the guide sleeve 13. The plunger 20 can reciprocate along its axis relative to the guide sleeve 13. The plunger 20 has an axially-extending bore. A rear part of the plunger 20 has a large-diameter portion 20a which slidably and coaxially extends in the guide sleeve 13. The plunger 20 can slide axially while being guided by the guide sleeve 13. The plunger 20 can swing together with the guide sleeve 13 about the axis of the bolts 12. It is preferable to provide a small radial clearance between the guide sleeve 13 and the large-diameter portion 20a of the plunger 20. The upper walls of the large-diameter portion 20a of the plunger 20 have a radial hole 20b. The wobble shaft 18a of the reciprocating plate 18 extends through an axially-extending elongate hole in the lower walls of the guide sleeve 13 and also through a hole in the lower walls of the plunger 20. The ball 18b on the tip of the wobble shaft 18a slidably fits in the radial hole 20b. Thus, the wobble shaft 18a engages the plunger 20 via the ball 18b. It is preferable to provide a small clearance between the ball 18b and the surfaces of the plunger 20 which define the radial hole 20b. The inclined shaft 9b, the reciprocating plate 18, the wobble shaft 18a, the ball 18b, and the engagement between the ball 18b and the plunger 20 compose a mechanism for converting rotation of the second shaft 9 into reciprocation of the plunger 20 along its axis.

A front end of the plunger 20 forms a blade attachment end 20c which has a slit 20d into which a saw blade 27 is inserted. The blade attachment end 20c of the plunger 20 has a stepped blade engagement pin 30 which acts to hold the saw blade 27 in position. The blade attachment end 20c of the plunger 20 is surrounded by blade holders 28 and 29. The saw blade 27 is attached to the saber saw as follows. First, the blade holder 28 is rotated to be moved rearward. The rearward movement of the blade holder 28 causes the stepped blade engagement pin 30 to shift to a release position at which the saw blade 27 can be inserted into the slit 20d. While the stepped blade engagement pin 30 is in its release position, the saw blade 27 is inserted into the slit 20d. Subsequently, the blade holder 28 is rotated to be moved frontward. The frontward movement of the blade holder 28 causes the stepped blade engagement pin 30 to engage the saw blade 27, thereby fixing and locking the saw blade 27 to the blade attachment end 20c of the plunger 20. The saw blade 27 can be attached to the saber saw in either a normal posture or an inverted posture. In other words, the saw blade 27 can be either normally or inversely attached to the saber saw. Here, "normally" means a normally-directed posture of the saw blade 27 with respect to the body of the saber saw. On the other hand, "inversely" means an inversely-directed posture of the saw blade 27 with respect to the body of the saber saw.

A front cover 24 made of resin extends outward of the inner cover 5, the gear cover 6, and a front portion of the saber-saw housing. A base 25 is connected via a lever 26 to a front end of the gear cover 6. The base 25 can move relative to the gear cover 6. During operation of the saber saw, the base 25 is used to stabilize the saber-saw body with respect to a workpiece 36.

Figure 10:
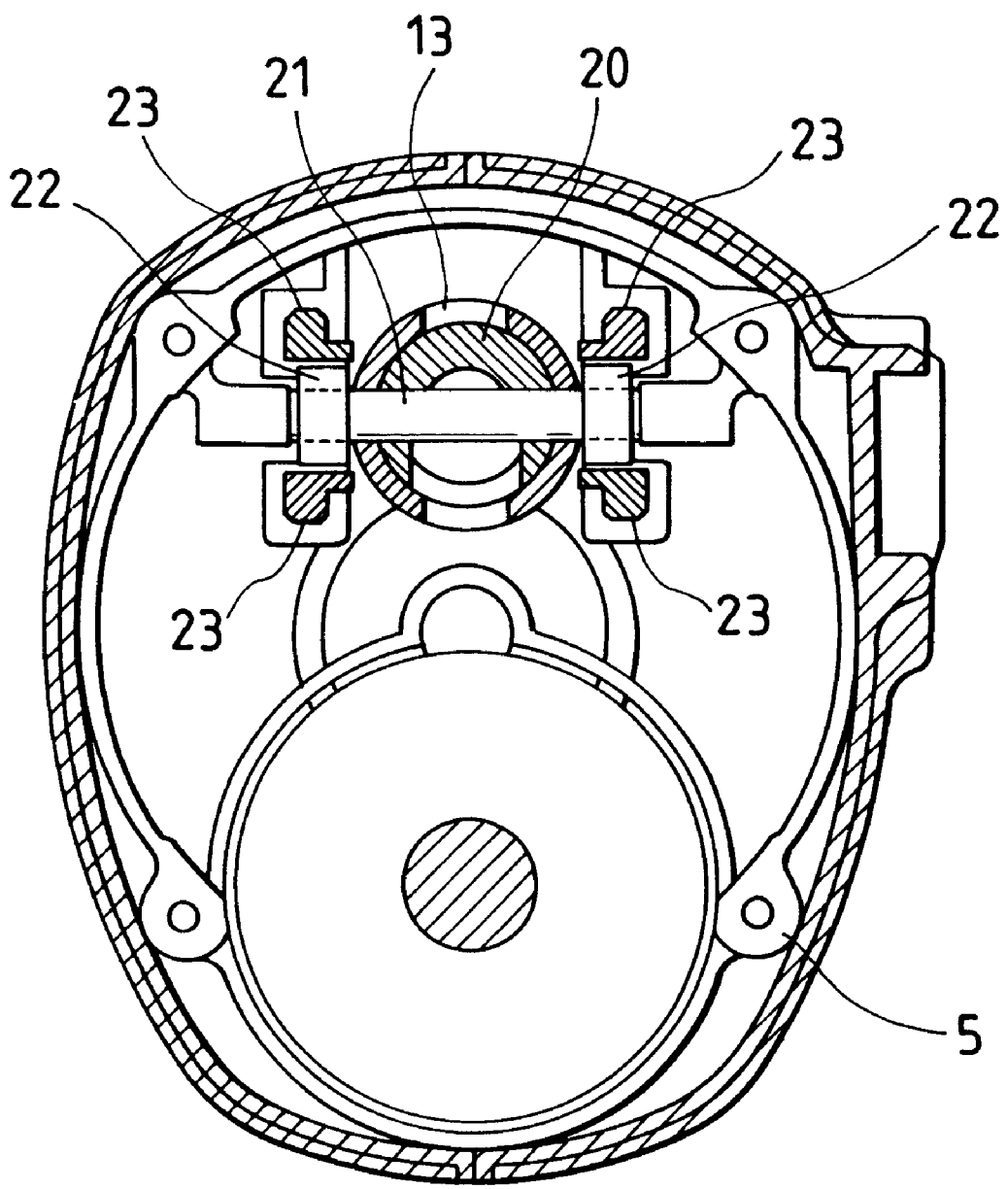
FIG. 10 is a sectional view taken along the line C—C in FIG. 7.
Figure 11:
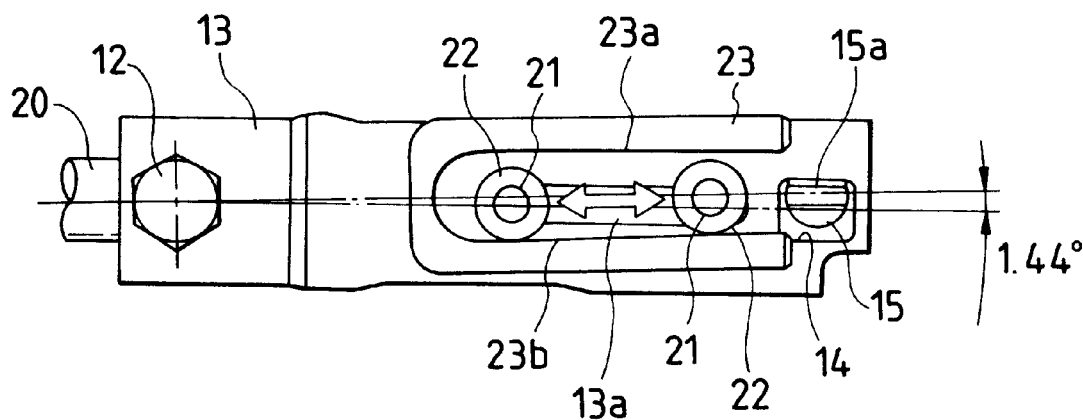
FIGS. 11 and 12 are side views of a portion of the saber saw in FIG. 7.

With reference to FIGS. 10 and 11, the guide sleeve 13 has axially-extending elongate holes 13a diametrically opposite to each other. A roller shaft 21 diametrically extends through the plunger 20. The roller shaft 21 is connected to the plunger 20. The roller shaft 21 also extends through the elongate holes 13a in the guide sleeve 13. The roller shaft 21 extends horizontally with respect to the saber-saw body. Rollers 22 are rotatably connected to opposite ends of the roller shaft 21, respectively. The roller shaft 21 and the rollers 22 reciprocate together with the plunger 20. The elongate holes 13a in the guide sleeve 13 serve as holes for guiding the roller shaft 21 when the roller shaft 21 reciprocates. As previously mentioned, the roller shaft 21 is connected to the plunger 20. The width (the height dimension) of the elongate holes 13a is only slightly greater than the outside diameter of the roller shaft 21 so that the guide sleeve 13 can substantially inhibit circumferential rotation of the plunger 20. The inhibition of circumferential rotation of the plunger 20 enables the saw blade 27 to be prevented from undesirably tilting.

U-shaped guide rails 23 are firmly held between the inner cover 5 and the gear cover 6. The rollers 22 are located in the recesses of the guide rails 23, respectively. The guide rails 23 are similar to each other. Therefore, only one of the guide rails 23 will be explained in more detail.

As best shown in FIG. 11, the guide rail 23 has upper and lower arms extending approximately along the axis of the plunger 20. A front portion of the guide rail 23 forms a bridge connecting the upper and lower arms thereof. The upper arm has an upper slant surface 23a facing the guide-rail recess. The lower arm has a lower slant surface 23b facing the guide-rail recess. Here, "slant" means an angular deviation from the axis of the plunger 20. Thus, the slant surfaces 23a and 23b extend out of parallel with the axis of the plunger 20. The axial length of the slant surfaces 23a and 23b is equal to or greater than the stroke of the plunger 20, that is, the distance for which the plunger 20 reciprocates. The slant surfaces 23a and 23b act as track surfaces or engagement surfaces.

As the plunger 20 reciprocates axially, the rollers 22 also reciprocate while contacting with and moving along the upper slant surfaces 23a or the lower slant surfaces 23b of the guide rails 23. Thus, during axial reciprocation of the plunger 20, the rollers 22 reciprocate while being guided by the upper slant surfaces 23a or the lower slant surfaces 23b of the guide rails 23. This guiding process causes the guide sleeve 13 and the plunger 20 to periodically swing about the axis of the bolts 12 in an angular range of 1.44°. Accordingly, the plunger 20 reciprocates axially while periodically swinging. Since the guide rails 23 are U-shaped and are held between the inner cover 5 and the gear cover 6, the assembly of the saber saw can be improved and the related structure can be simplified. The swinging mechanism which includes the rollers 22 and the guide rails 23 makes it possible to increase the life of the saber saw.

Figure 12:
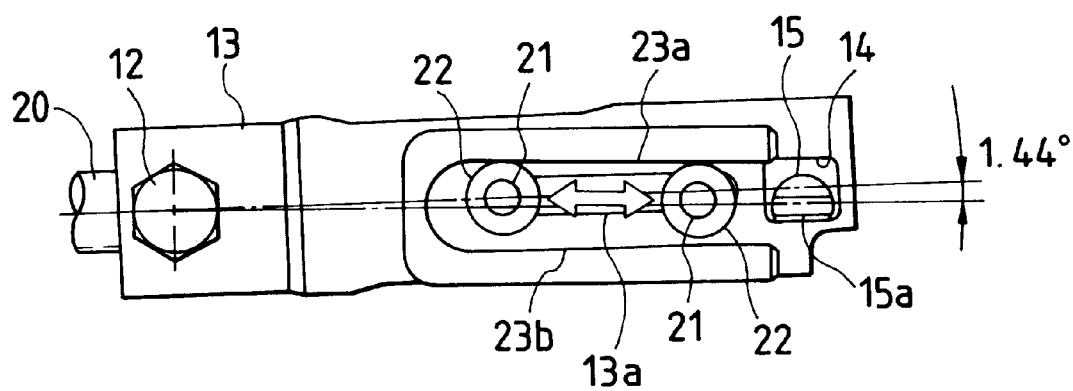

With reference to FIGS. 11 and 12, the change shaft 15 is in positions at which the guide sleeve 13 is permitted to swing. When the change shaft 15 is in the swing permitting positions, the flat surface portions 15a of the change shaft 15 are substantially parallel with the axis of the plunger 20. In these case, the through hole 14 in the guide sleeve 13 allows swing of the guide sleeve 13 relative to the change shaft 15. Thus, during reciprocation of the plunger 20, the rollers 22 also reciprocate while contacting with and moving along the upper slant surfaces 23a or the lower slant surfaces 23b of the guide rails 23. It should be noted that one roller 22 is illustrated as two rollers which assume respective limit positions in the stroke thereof.

Figure 13:
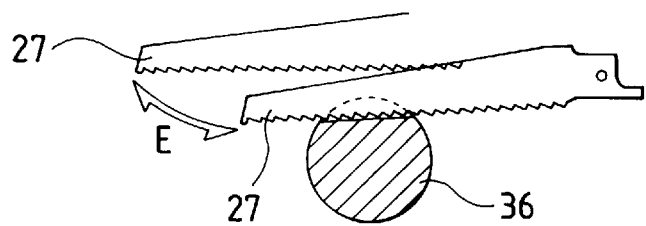
FIG. 13 is a diagram of a trajectory described by a saw blade in the saber saw in FIG. 7.

FIG. 13 shows motion of the saw blade 27 which occurs in the case where the rollers 22 reciprocate while contacting with and moving along the slant surfaces 23b of the guide rails 23 (see FIG. 11). In FIG. 13, the saw blade 27 is normally attached to the plunger 20. The slant surfaces 23b of the guide rails 23 are designed so that the saw blade 27 moves along a curved path or trajectory "E". In this case, the saw blade 27 is moved into a workpiece 36 and the teeth of the saw blade 27 properly engage the workpiece 36 when the saw blade 27 is drawn into the body of the saber saw.

Figure 14:
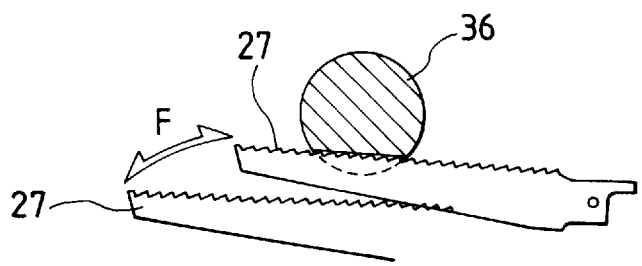
FIG. 14 is a diagram of a trajectory described by the saw blade in the saber saw in FIG. 7.

FIG. 14 shows motion of the saw blade 27 which occurs in the case where the rollers 22 reciprocate while contacting with and moving along the slant surfaces 23a of the guide rails 23 (see FIG. 12). In FIG. 14, the saw blade 27 is inversely attached to the plunger 20. The slant surfaces 23a of the guide rails 23 are designed so that the saw blade 27 moves along a curved path or trajectory "F". In this case, the saw blade 27 is moved into a workpiece 36 and the teeth of the saw blade 27 properly engage the workpiece 36 when the saw blade 27 is drawn into the body of the saber saw.

Thus, regardless of whether the saw blade 27 is normally or inversely attached to the plunger 20, the saw blade 27 is moved into a workpiece 36 and the teeth of the saw blade 27 properly engage the workpiece 36 when the saw blade 27 is drawn into the body of the saber saw. Accordingly, the saber saw can implement an orbital cutting process regardless of whether the saw blade 27 is normally or inversely attached to the plunger 20.

Figure 15:
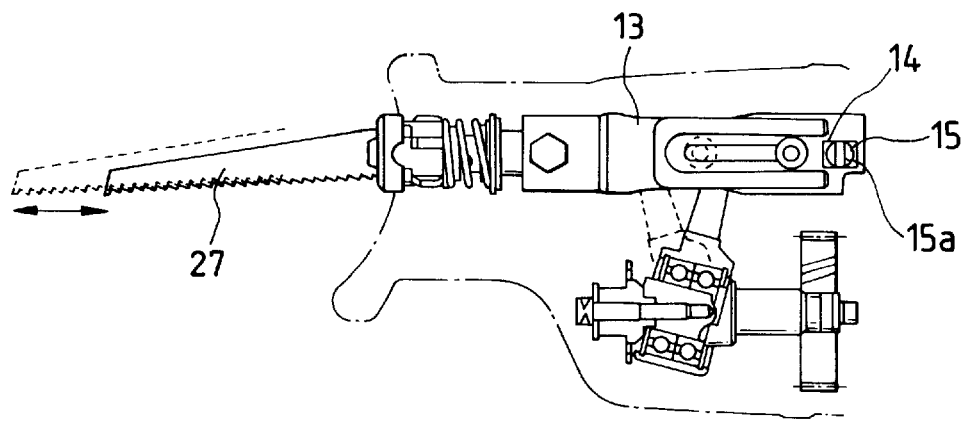
FIGS. 15, 16, and 17 are diagrammatic side views of a portion of the saber saw in FIG. 7.

With reference to FIG. 15, the change shaft 15 is in a position at which the guide sleeve 13 is inhibited from swinging. When the change shaft 15 is in the swing inhibiting position, the flat surface portions 15a of the change shaft 15 are substantially perpendicular to the axis of the plunger 20. In these case, opposite outer surfaces of the change shaft 15 substantially engage the walls of the guide sleeve 13 which define the through hole 14. Thus, the change shaft 15 inhibits swing of the guide sleeve 13 relative thereto. As a result, the plunger 20 and the saw blade 27 perform simple linear reciprocation. The simple linear reciprocation of the saw blade 27 is suitable for cutting a hard workpiece such as a steel workpiece which generates a great reaction force.

Figure 16:
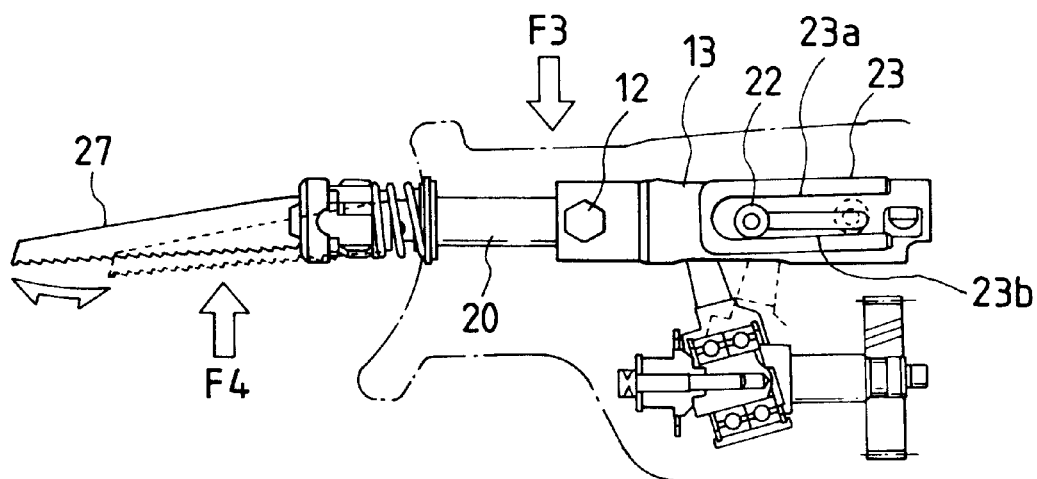

FIG. 16 shows conditions of the saber saw in which the saw blade 27 is normally attached to the plunger 20 and the orbital cutting process is implemented by the saber saw. In FIG. 16, the teeth of the saw blade 27 face downward. During operation of the saber saw, a user applies a downward pressing force F3 to the body of the saber saw. At the same time, the saw blade 27 receives an upward reaction force F4 from a workpiece. The reaction force F4 travels from the saw blade 27 to the plunger 20. The plunger 20 causes the guide sleeve 13 to swing clockwise about the axis of the bolts 12 in response to the reaction force F4. The rollers 22 move downward in accordance with the clockwise swing of the guide sleeve 13, encountering the slant surfaces 23b of the guide rails 23. Then, the rollers 22 are pressed against the slant surfaces 23b of the guide rails 23. Thus, the rollers 22 reciprocate while being guided by the slant surfaces 23b of the guide rails 23. As a result, the orbital cutting process is executed which is determined by the slant surfaces 23b of the guide rails 23.

Figure 17:
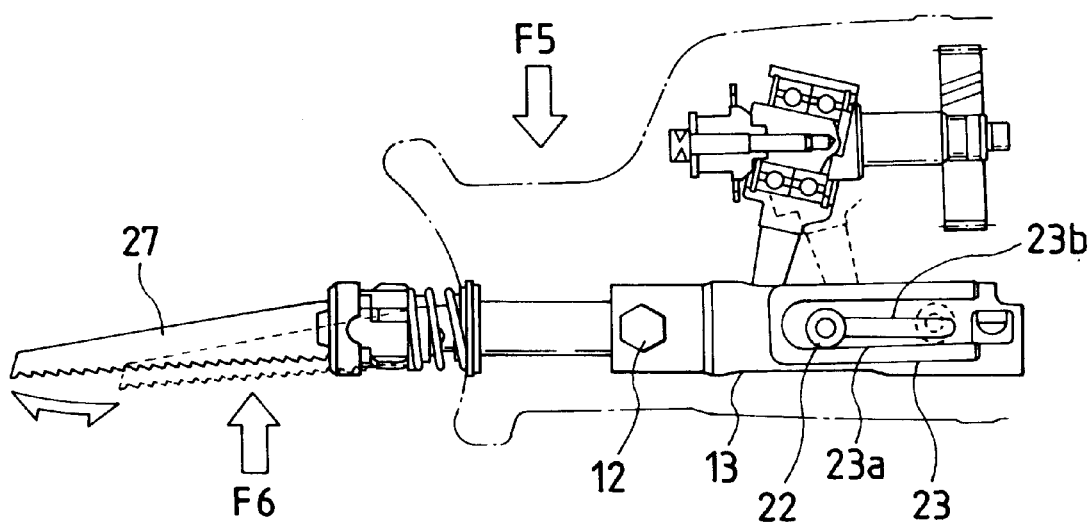

FIG. 17 shows conditions of the saber saw in which the saw blade 27 is inversely attached to the plunger 20 and the orbital cutting process is implemented by the saber saw. In FIG. 17, the teeth of the saw blade 27 face downward while the body of the saber saw is inverted. During operation of the saber saw, a user applies a downward pressing force F5 to the body of the saber saw. At the same time, the saw blade 27 receives an upward reaction force F6 from a workpiece. The reaction force F6 travels from the saw blade 27 to the plunger 20. The plunger 20 causes the guide sleeve 13 to swing clockwise about the axis of the bolts 12 in response to the reaction force F6. The rollers 22 move downward as viewed in FIG. 17 in accordance with the clockwise swing of the guide sleeve 13, encountering the slant surfaces 23a of the guide rails 23. Then, the rollers 22 are pressed against the slant surfaces 23a of the guide rails 23. Thus, the rollers 22 reciprocate while being guided by the slant surfaces 23a of the guide rails 23. As a result, the orbital cutting process is executed which is determined by the slant surfaces 23a of the guide rails 23.

During the execution of the orbital cutting process by the saw blade, a path or trajectory of motion of the saw blade 27 is determined by the profiles (the shapes) of the slant surfaces 23a or the slant surfaces 23b of the guide rails 23. The orbital cutting process can be efficient by appropriately setting the profiles or shapes of the slant surfaces 23a and 23b of the guide rails 23. As previously mentioned, the orbital cutting process can be implemented by the saber saw regardless of whether the saw blade 27 is normally or inversely attached to the plunger 20.

Second Embodiment

Figure 18:
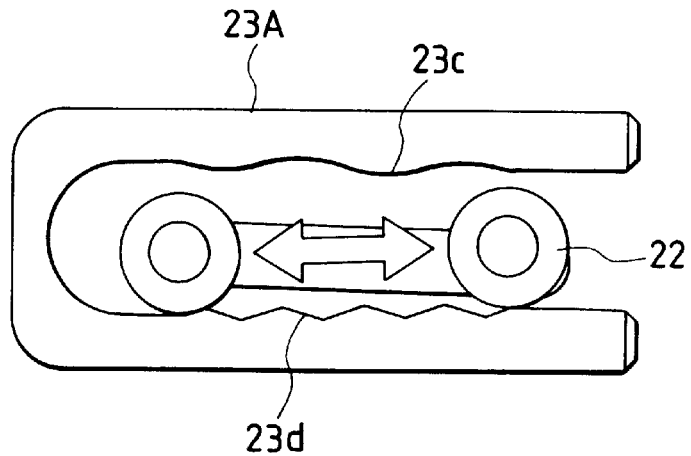
FIG. 18 is a side view of a guide rail and a roller in a saber saw according to a second embodiment of this invention.

A second embodiment of this invention is similar to the first embodiment thereof except that guide rails 23A replace the guide rails 23. The guide rails 23A are similar to each other. Therefore, only one of the guide rails 23A will be explained below in detail. As shown in FIG. 18, a guide rail 23A has upper and lower arms formed with upper and lower slant surfaces 23c and 23d, respectively, which define the guide-rail recess. During operation of a saber saw, a related roller 22 reciprocates while contacting with and moving along the upper slant surface 23c or the lower slant surface 23d of the guide rail 23A. The upper slant surface 23c has waveform profiles. The lower slant surface 23d has saw-toothed profiles. The upper and lower slant surfaces 23c and 23d act as track surfaces or engagement surfaces.

Figure 19:
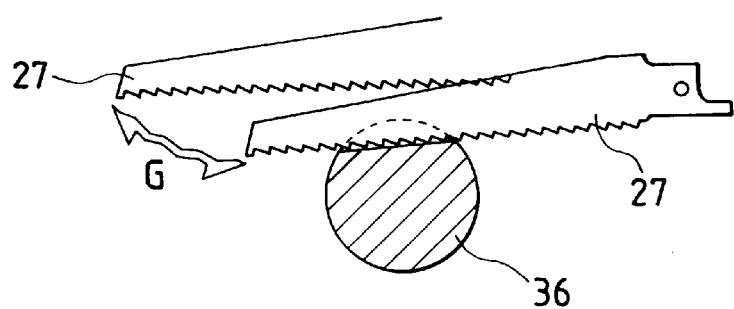
FIG. 19 is a diagram of a trajectory described by a saw blade in the saber saw in the second embodiment of this invention.

FIG. 19 shows motion of a saw blade 27 which occurs in the case where the rollers 22 reciprocate while contacting with and moving along the slant surfaces 23d of the guide rails 23A (see FIG. 18). In FIG. 19, the saw blade 27 is normally attached to a plunger 20 (see FIG. 7). Specifically, the saw blade 27 moves along a saw-toothed path or trajectory "G" reflecting the saw-toothed profiles of the slant surfaces 23d of the guide rails 23A. In this case, an impulsive cutting force is periodically applied to the saw blade 27. Thus, this mode of operation of the saber saw is suitable for cutting a hard and fragile workpiece such as a ceramic workpiece.

Figure 20:
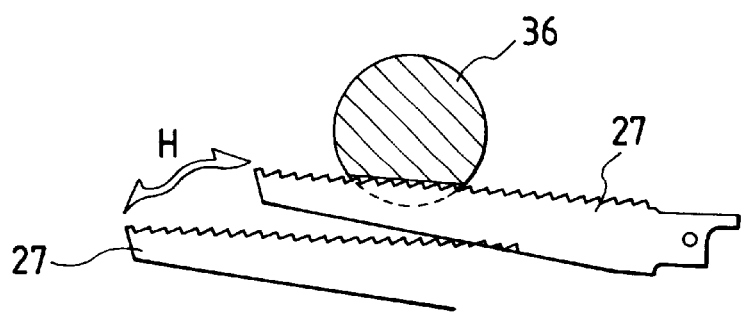
FIG. 20 is a diagram of a trajectory described by the saw blade in the saber saw in the second embodiment of this invention.

FIG. 20 shows motion of the saw blade 27 which occurs in the case where the rollers 22 reciprocate while contacting with and moving along the slant surfaces 23c of the guide rails 23A (see FIG. 18). In FIG. 20, the saw blade 27 is inversely attached to the plunger 20 (see FIG. 7). Specifically, the saw blade 27 moves along a waveform path or trajectory "H" reflecting the waveform profiles of the slant surfaces 23c of the guide rails 23A. In this case, an impulsive cutting force is periodically applied to the saw blade 27. Also, this mode of operation of the saber saw is suitable for cutting a hard and fragile workpiece such as a ceramic workpiece.

Third Embodiment

A third embodiment of this invention is similar to the first embodiment thereof except for design changes mentioned hereinafter.

Figure 21:
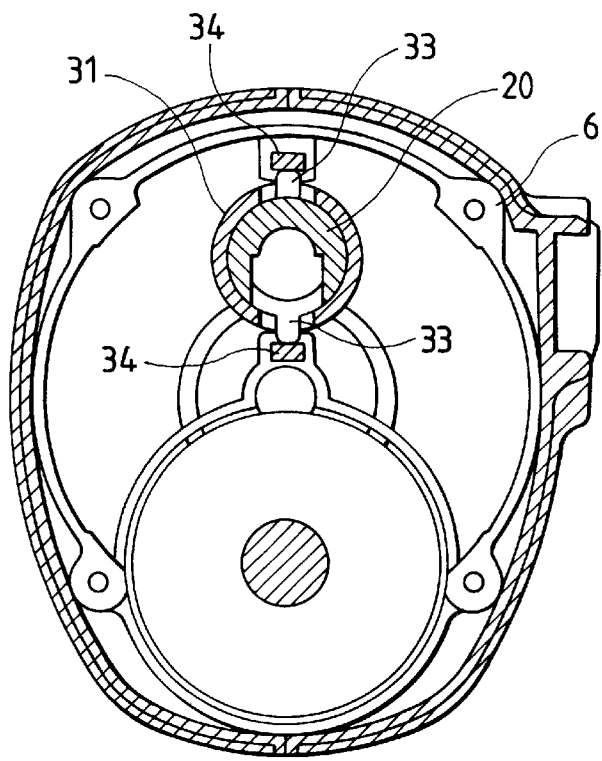
FIG. 21 is a sectional view of a saber saw according to a third embodiment of this invention.
Figure 22:
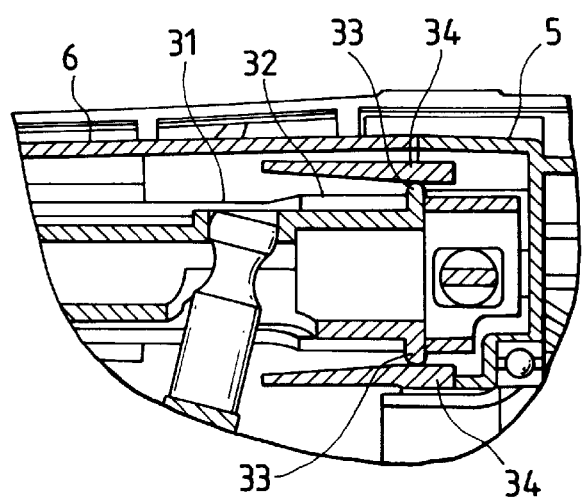
FIG. 22 is a sectional view of a portion of the saber saw in the third embodiment of this invention.

With reference to FIGS. 21 and 22, a rear portion of a plunger 20 in the third embodiment of this invention has upper and lower radially-extending projections 33 which are diametrically opposite to each other. The projections 33 extend through axially-extending elongate holes 32 in a guide sleeve 31. Upper and lower guide rails 34 are firmly held between an inner cover 5 and a gear cover 6. The guide rails 34 extend substantially along the axis of the plunger 20. The guide rails 34 are diametrically opposite to each other with respect to the plunger 20. The upper guide rail 34 has a slant surface (a track surface or an engagement surface) with which the upper projection 33 on the plunger 20 can contact and engage. The lower guide rail 34 has a slant surface (a track surface or an engagement surface) with which the lower projection 33 on the plunger 20 can contact and engage.

During a first mode of operation of a saber saw in the third embodiment of this invention, the lower projection 33 and the lower guide rail 34 are active while the upper projection 33 and the upper guide rail 34 are inactive. Specifically, during the first mode of operation, the lower projection 33 on the plunger 20 contacts with and moves along the slant surface of the lower guide rail 34 while the plunger 20 reciprocates. During a second mode of operation of the saber saw, the upper projection 33 and the upper guide rail 34 are active while the lower projection 33 and the lower guide rail 34 are inactive. Specifically, during the second mode of operation, the upper projection 33 on the plunger 20 contacts with and moves along the slant surface of the upper guide rail 34 while the plunger 20 reciprocates.

The saber saw in the third embodiment of this invention can be simple in structure, and can implement an orbital cutting process.

What is claimed is:
1. A saber saw comprising:
  a housing;
  a motor contained in the housing:
  a shaft rotatably connected to the housing and being rotated by the motor;
  a plunger connected to the housing for holding a saw blade, the plunger being free to reciprocate;
  a motion converting mechanism provided between the shaft and the plunger for converting rotation of the shaft into reciprocation of the plunger;
  a guide member connected to the housing and having a track surface; and
  means connected to the plunger for moving along the track surface of the guide member during reciprocation of the plunger;

wherein said means comprises a follower member connected to the plunger and being normally separate from the track surface of the guide member, the follower member being brought into contact with the track surface of the guide member by a reaction force from a workpiece.

2. A saber saw as recited in claim 1, wherein the guide member comprises a first sub guide member having a first sub track surface and a second sub guide member having a second sub track surface, and the moving means comprises a roller shaft connected to the plunger and extending through the plunger in a direction perpendicular to a direction of reciprocation of the plunger, and rollers connected to two ends of the roller shaft respectively, and contacting with and moving along the first and second sub track surfaces respectively during reciprocation of the plunger.

3. A saber saw comprising:
a housing:
a motor contained in the housing;
a shaft rotatably connected to the housing and being rotated by the motor:
a plunger connected to the housing for holding a saw blade, the plunger being free to reciprocate:
a guide sleeve connected to the housing and supporting the plunger, the guide sleeve being movable in a direction substantially perpendicular to a direction of reciprocation of the plunger;
a motion converting mechanism provided between the shaft and the plunger for converting rotation of the shaft into reciprocation of the plunger;
guide members connected to the housing and having respective track surfaces;
a roller shaft connected to a rear portion of the plunger and extending through the rear portion of the plunger in a direction perpendicular to a direction of reciprocation of the plunger, the roller shaft extending through the guide sleeve; and
rollers respectively connected to two ends of the roller shaft and being normally separate from the respective track surfaces of the guide members, the rollers being brought into contact with selected ones of the respective track surfaces of the guide members by a reaction force from a work piece, the rollers contacting with and moving along the selected ones of the respective track surfaces of the guide members during reciprocation of the plunger.

4. A saber saw as recited in claim 1, wherein the guide member comprises an upper guide member and a lower guide member.

5. A saber saw as recited in claim 4, wherein an end of the upper guide member and an end of the lower guide member are connected to each other.

6. A saber saw as recited in claim 1, wherein the housing comprises an inner cover and a gear cover, and the guide member is firmly held between the inner cover and the gear cover.

7. A saber saw as recited in claim 3, wherein the guide sleeve has an elongate hole extending along the direction of reciprocation of the plunger, and the roller shaft extends through the elongate hole in the guide member, and wherein a height dimension of the elongate hole is slightly greater than a diameter of the roller shaft.

8. A saber saw as recited in claim 1, wherein the track surface of the guide member has one of a saw-toothed shape and a waveform.

9. A saber saw as recited in claim 4, wherein a shape of a track surface of the upper guide member and a shape of a track surface of the lower guide member are different from each other.

10. A saber saw as recited in claim 3, wherein each of the guide members comprises an upper guide member and a lower guide member.

11. A saber saw as recited in claim 10, wherein an end of the upper guide member and an end of the lower guide member of said each of the guide members are connected to each other.

12. A saber saw as recited in claim 3, wherein the housing comprises an inner cover and a gear cover, and the guide members are firmly held between the inner cover and the gear cover.

13. A saber saw as recited in claim 3, wherein the track surfaces of the guide members have one of a saw-toothed shape and a waveform.

14. A saber saw as recited in claim 10, wherein a shape of a track surface of the upper guide member and a shape of a track surface of the lower guide member of said each of the guide members are different from each other.

15. A saber saw comprising:
a plunger for holding a saw blade;
means for reciprocating the plunger along an axis of the plunger;
an engagement member connected to the plunger; and
first and second guide members having first and second engagement surfaces respectively, the first and second engagement surfaces angularly deviating from the axis of the plunger;
wherein the engagement member contactedly moves along either the first engagement surface of the first guide member or the second engagement surface of the second guide member during reciprocation of the plunger, and wherein the engagement member is separate from the first engagement surface of the first guide member when moving along the second engagement surface of the second guide member, and is separate from the second engagement surface of the second guide member when moving along the first engagement surface of the first guide member.

16. A saber saw as recited in claim 15, wherein the engagement member comprises a roller.

17. A saber saw as recited in claim 15, wherein the engagement member is located between the first and second engagement surfaces of the first and second guide members.

18. A saber saw comprising:
a plunger for holding a saw blade;
means for reciprocating the plunger along an axis of the plunger;
first and second engagement members connected to the plunger; and
first and second guide members having first and second engagement surfaces respectively, the first and second engagement surfaces angularly deviating from the axis of the plunger;
wherein the first engagement member contacts with and moves along the first engagement surface of the first guide member so that the first engagement member and the first guide member are active during reciprocation of the plunger in a first mode of saber saw operation, and the second engagement member contacts with and moves along the second engagement surface of the second guide member so that the second engagement member and the second guide member are active during reciprocation of the plunger in a second mode of saber saw operation which differs from the first mode.

19. A saber saw comprising:

a plunger for holding a saw blade:

means for reciprocating the plunger along an axis of the plunger;

an engagement member connected to the plunger; and first and second guide members having first and second engagement surfaces respectively, the first and second engagement surfaces angularly deviating from the axis of the plunger in opposite directions respectively;

wherein the engagement member contactedly moves along either the first engagement surface of the first guide member or the second engagement surface of the second guide member during reciprocation of the plunger.

20. A saber saw as recited in claim 15, wherein the first and second engagement surfaces angularly deviate from the axis of the plunger in opposite directions respectively.

21. A saber saw as recited in claim 3, further comprising a change shaft supported by the housing and extending into a hole in the guide sleeve, the change shaft being movable into and out of engagement with the guide sleeve, the guide sleeve being able to swing, the change shaft inhibiting swing of the guide sleeve when being in engagement therewith, the change shaft permitting swing of the guide sleeve when being out of engagement therewith.

22. A saber saw as recited in claim 15, further comprising a guide sleeve supporting the plunger and being able to swing in a direction substantially perpendicular to a direction of reciprocation of the plunger, and a change shaft extending into a hole in the guide sleeve and being movable into and out of engagement with the guide sleeve, the change shaft inhibiting swing of the guide sleeve when being in engagement therewith, the change shaft permitting swing of the guide sleeve when being out of engagement therewith.

23. A saber saw as recited in claim 19, further comprising a guide sleeve supporting the plunger and being able to swing in a direction substantially perpendicular to a direction of reciprocation of the plunger and a change shaft extending into a hole in the guide sleeve and being movable into and out of engagement with the guide sleeve, the change shaft inhibiting swing of the guide sleeve when being in engagement therewith, the change shaft permitting swing of the guide sleeve when being out of engagement therewith.

\* \* \* \* \*